(12) United States Patent
Uesugi (10) Patent No.: US 6,804,491 B1
(45) Date of Patent: Oct. 12, 2004

(54) MOBILE COMMUNICATION SYSTEM AND REPEATER USED IN THE MOBILE COMMUNICATION SYSTEM

(75) Inventor: Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,337

(22) PCT Filed: Mar. 28, 2000

(86) PCT No.: PCT/JP00/01908

§ 371 (c)(1),
(2), (4) Date: Nov. 28, 2000

(87) PCT Pub. No.: WO00/60767

PCT Pub. Date: Oct. 12, 2000

(30) Foreign Application Priority Data

Mar. 31, 1999 (JP) .......................... 11-094288

(51) Int. Cl.$^7$ ............................................. H04B 7/15
(52) U.S. Cl. ............................ 455/11.1; 455/16; 455/7; 375/211; 370/315
(58) Field of Search ............................. 455/7, 8, 9, 10, 455/11.1, 124, 113.1, 561, 562.1, 164, 272, 15; 375/211, 212; 376/274, 275, 246, 492, 347, 321, 315, 310

(56) References Cited

U.S. PATENT DOCUMENTS

| | | | | |
|---|---|---|---|---|
| 4,727,590 A | * | 2/1988 | Kawano et al. ............. | 455/446 |
| 5,152,002 A | * | 9/1992 | Leslie et al. ............. | 455/422.1 |
| 5,168,574 A | * | 12/1992 | Gordon et al. ............. | 455/9 |
| 5,179,720 A | * | 1/1993 | Grube et al. ............. | 455/16 |
| 5,218,715 A | * | 6/1993 | Leslie et al. ............. | 455/15 |
| 5,509,028 A | * | 4/1996 | Marque-Pucheu ............. | 375/211 |
| 5,883,884 A | * | 3/1999 | Atkinson ............. | 370/279 |
| 5,890,055 A | * | 3/1999 | Chu et al. ............. | 455/16 |
| 5,901,342 A | * | 5/1999 | Heiskari et al. ............. | 455/11.1 |
| 5,907,794 A | * | 5/1999 | Lehmusto et al. ............. | 455/11.1 |
| 5,970,410 A | * | 10/1999 | Carney et al. ............. | 455/446 |
| 6,088,592 A | * | 7/2000 | Doner et al. ............. | 455/447 |
| 6,122,513 A | * | 9/2000 | Bassirat ............. | 455/443 |
| 6,141,533 A | * | 10/2000 | Wilson et al. ............. | 455/11.1 |
| 6,272,351 B1 | * | 8/2001 | Langston et al. ............. | 455/507 |
| 6,373,833 B1 | * | 4/2002 | Suonvieri et al. ............. | 370/347 |

FOREIGN PATENT DOCUMENTS

| | | |
|---|---|---|
| JP | 55147042 | 11/1980 |
| JP | 8265034 | 10/1996 |
| WO | 9414289 | 6/1994 |

* cited by examiner

Primary Examiner—Tilahun Gesesse
(74) Attorney, Agent, or Firm—Stevens, Davis, Miller & Mosher, LLP.

(57) ABSTRACT

When a base station 205 employs frequencies f1, f2 and f3, repeaters 201 to 204 provided with filters passing only f1 are placed. According to this configuration, repeater apparatus causes only f1 to be passed to reach in the distance so as to enlarge cells 207 to 210 according to only specific channel (frequency f1).

5 Claims, 13 Drawing Sheets

MOBILE COMMUNICATION SYSTEM AND REPEATER USED IN THE MOBILE COMMUNICATION SYSTEM

TECHNICAL FIELD

The present invention relates to a digital mobile communication system such as a cellular system and so forth.

BACKGROUND ART

Conventionally, in a mobile communication system, when a radio area is intended to be enlarged, for instance, in a cellular system, when a radius of a cell is intended to be enlarged, the mobile communication system causes a transmission signal to be propagated in the distance while employing an amplifier with large amplification factor, since when a high-frequency wave is employed, a propagation loss is remarkable. In another way, enlargement of a radio area is performed in such a way that a mobile communication system places many base stations.

However, in a conventional mobile communication system, when an amplifier with large amplification factor is employed, it is necessary that the amplifier increases its amplification factor with progression of transmission in the distance. As a result, the size of an amplifier becomes considerably large. Thus there is a problem that the size of a base station becomes large in proportion to the size of an amplifier.

Moreover, there is a problem that power consumption of a mobile station apparatus becomes large because power required in a mobile station becomes large and also interference between adjacent cells is easy to occur with progression of size of the cell.

Furthermore, when many base stations are placed, there are problems that to secure installation places for base stations is difficult and/or an installed cost becomes high as a whole system. In this case, it is necessary for the mobile station to perform hand-over frequently, accordingly, it is difficult for the mobile station to perform communication during a high speed movement.

DISCLOSURE OF INVENTION

The present invention is achieved by taking account of this point. An object of the present invention is to provide a repeater apparatus capable of enlarging an radio area of a base station while suppressing an increase of the size of a base station, power consumption of a mobile station, the costs of the whole system, and interference in an adjacent cell.

This object is achieved in such a way that a repeater which is provided with a filter causing a specified channel to be passed is placed within a cell of a base station, and which passes specified frequencies used in the base station through the repeater and propagates them outer side of the cell in the distance. For this reason, it is possible to enlarge a cell area for only specified channel (specific frequency).

BEST MODE FOR CARRYING OUT THE INVENTION

Embodiments of the present invention will be described specifically below with reference to accompanying drawings.

Embodiment 1

Figure 1:
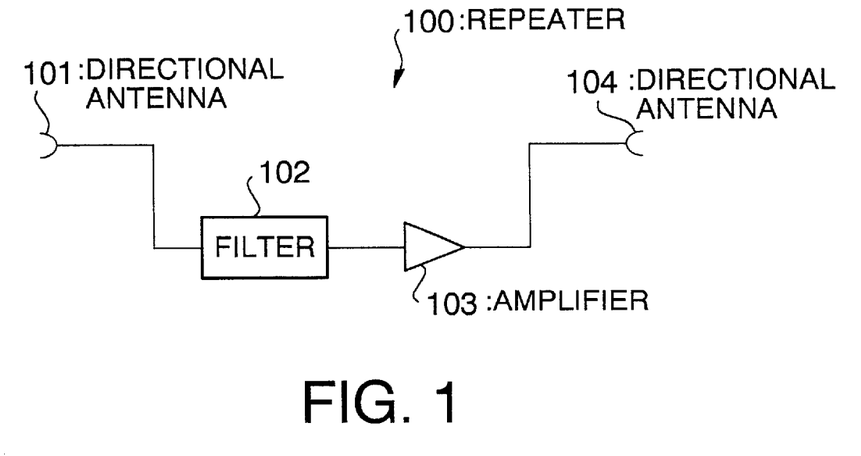
FIG. 1 is a block diagram illustrating a configuration of a repeater applied to a mobile communication system according to an embodiment 1 of the present invention.

FIG. 1 is a block diagram illustrating a configuration of a repeater applied to a mobile communication system according to an embodiment 1 of the present invention.

A repeater 100 illustrated in FIG. 1 is configured to be provided with a directional antenna 101 for receiving a radio wave of a specific direction, a filter for filtering (extracting) predetermined signal from among signals received by the directional antenna 101, an amplifier 103 for amplifying signals passed through the filter 102, and a directional antenna 104 for transmitting the signal amplified by the amplifier 103 in a specific direction.

As to a filter 102, when the repeater 100 is applied to FDMA (Frequency Division Multiple Access) system, a FDMA filter which passes through signals of only specific frequency is used. When the repeater 100 is applied to CDMA (Code Division Multiple Access) system, a CDMA filter which passes through only signals which are subjected to spreading with specific code by performing each processing of despreading, demodulation, spreading, and modulation is used. When the repeater 100 is applied to TDMA (Time Division Multiple Access) system, a TDMA filter which passes through signals during only specific time is used. In other words, the filter 100 passes through only signals of predetermined channel.

An example in which such a repeater 100 is used in a cellular system will be described referring to FIG. 2 to FIG. 4. However, the FDMA filter is used as the filter 102.

Figure 2:
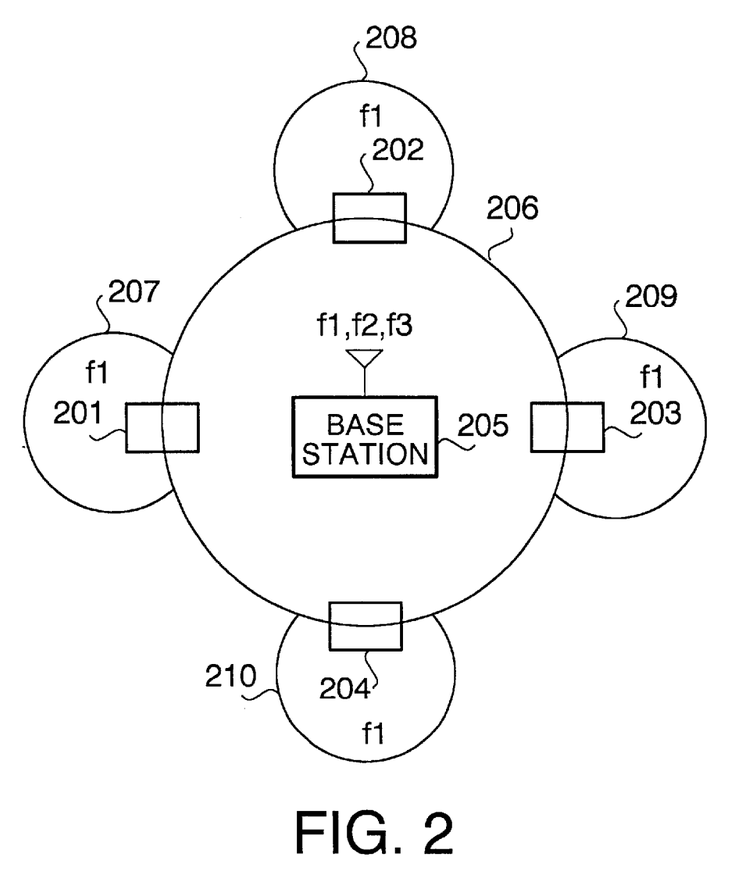
FIG. 2 is a first conception view when the repeater according to the above embodiment 1 is employed in a cellular system.

As illustrated in FIG. 2, the repeaters 201 to 204 are placed along circumference of the cell 206 formed by a radio wave of the base station 205. The repeaters 201 to 204 are set so as to pass only a frequency f1. Directional antennas of reception sides of the repeaters 201 to 204 are set in a direction of the base station 205.

In this case, when the base station 205 uses frequencies f1, f2, and f3, the repeaters 201 to 204 pass and amplify only a signal of the frequency f1. Consequently, since the signal of the frequency f1 reaches in the distance, radio wave areas 207 to 210 are formed in the outer side of the cell 206.

In FIG. 2, the repeaters 201 to 204 are placed along circumference of the cell 206 with an interval of 90 degrees. In accordance with this placement, the radio wave areas 207 to 210 are formed independently due to the repeaters 201 to 204. However, it is also suitable that a radio wave area is formed in the outer side of the cell 206 over the whole circumference thereof while using more repeaters.

Figure 3:
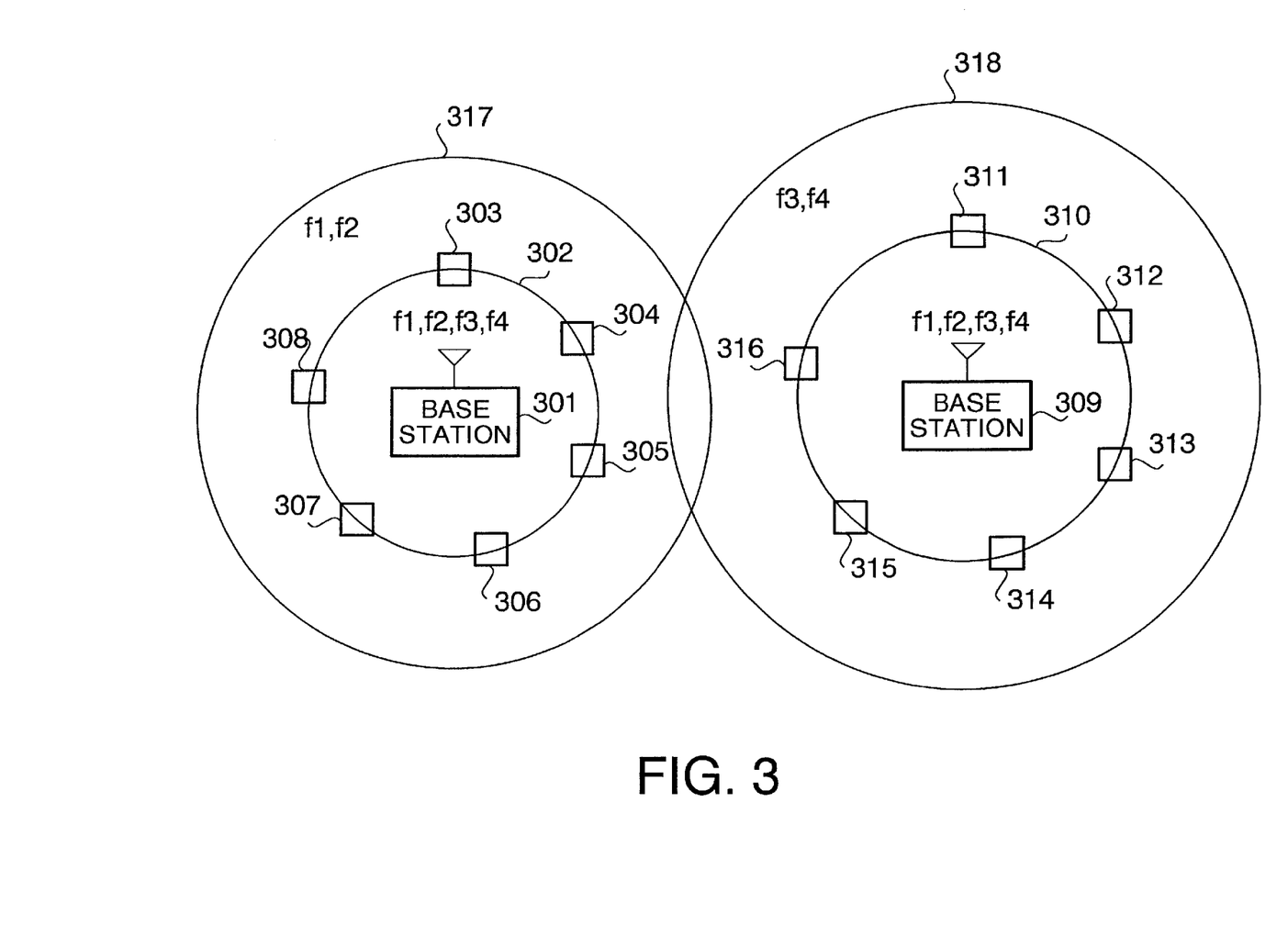
FIG. 3 is a second conception view when the repeater according to the above embodiment 1 is employed in a cellular system.
Figure 4:
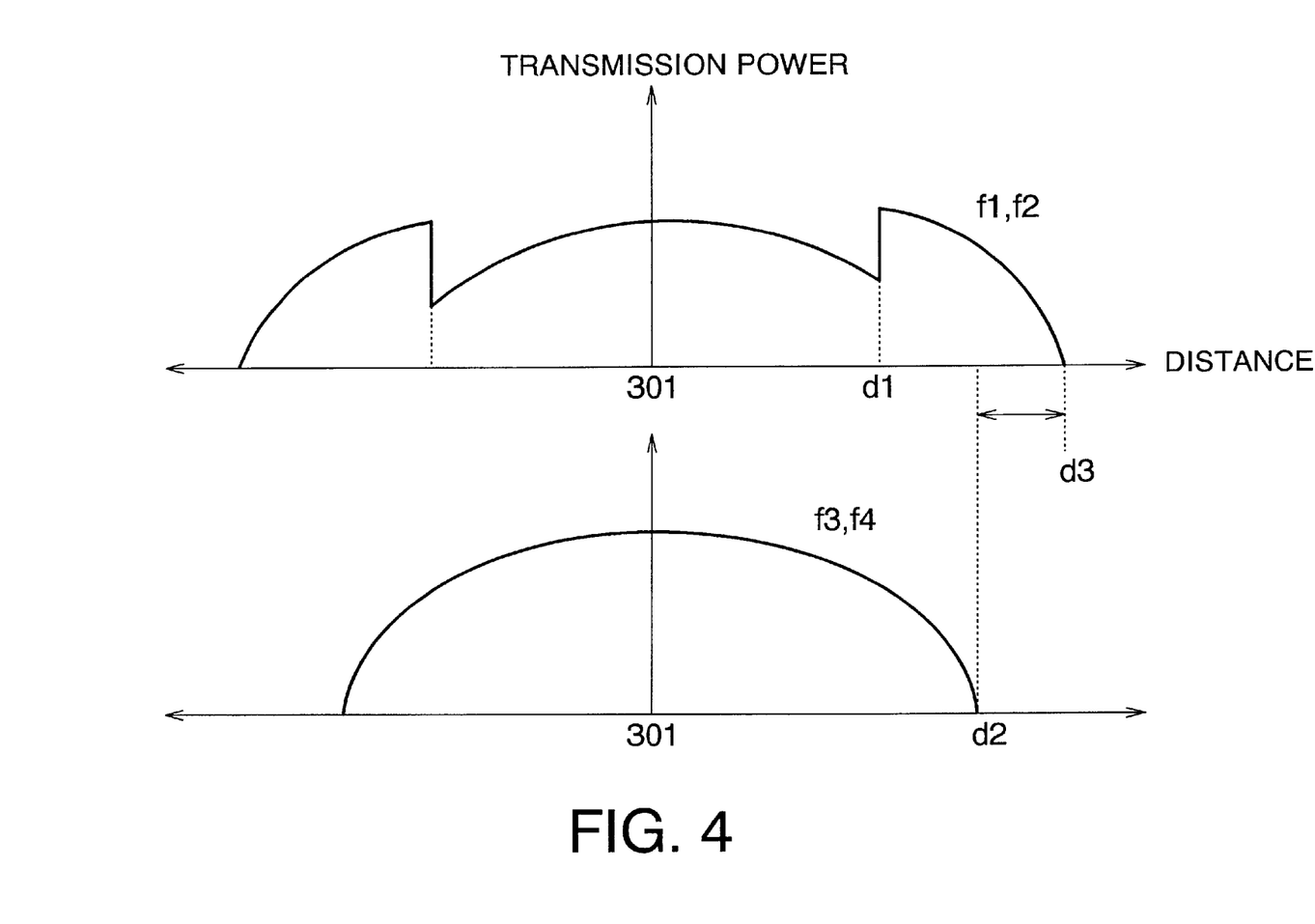
FIG. 4 is a schematic view illustrating the relationship between transmitting power and a distance concerning a base station and a repeater illustrated in FIG. 3.

As illustrated in FIG. 3, a plurality of repeaters 303 to 308 for passing frequencies f1 and f2 are formed along circumference of a cell 302 formed by a radio wave of a base station 301. While a plurality of repeaters 311 to 316 for passing frequencies f3 and f4 are formed along circumference of a cell 310 formed by a radio wave of a base station 309. Further, respective cells 302 and 310 are formed so that two cells do not cross with each other.

In this case, on the supposition that both base stations 301 and 309 use frequencies f1 to f4, since the repeaters 303 to 308 pass and amplify only signals of the frequencies f1 and f2, the signals of the frequencies f1 and f2 reach in the distance, thus a radio wave area 317 of the frequencies f1 and f2 is formed in the outer side of the cell 302.

In the meantime, since the repeaters 311 to 316 pass and amplify signals of the frequencies f3 and f4, the signals of the frequencies f3 and f4 reach in the distance, thus a radio wave area 318 of the frequencies f3 and f4 is formed in the outer side of the cell 310.

A relationship of this case between transmitting power of a signal transmitted by the base station 301 and a distance will be described referring to FIG. 4. The transmitting power (transmission signal power) of signals corresponding to the frequencies f1 to f4 among signals transmitted by the base station 301 is maintained at a value by which a mobile station can perform communication appropriately to a position d1 where the repeaters 303 to 308 are placed. Subsequently, with reference to the transmitting power of signals corresponding to the frequencies f3 and f4 among signals transmitted by the base station 301, the transmitting power is attenuated to a value by which the mobile station becomes impossible to perform communication appropriately in an attenuation position d2. While with reference to the transmitting power of signals corresponding to the frequencies f1 and f2 transmitted by the base station 301, since the transmitting power is amplified due to the repeaters 303 to 308, the transmitting power is attenuated to a value by which the mobile station becomes impossible to perform communication appropriately in an attenuation position d3 not the attenuation position d2.

Thus, according to the present embodiment, in FIG. 2, when the base station 205 uses the frequencies f1, f2 and f3, since the repeaters 201 to 204 capable of passing through only the frequency f1, it is possible to pass and reached the signal of the frequency f1 in the distance. Namely, an area of a cell can be enlarged concerning only a specified channel.

Further, in FIG. 3, with reference to two base stations 301 and 309 using the frequencies f1 to f4, one side passes through only the frequencies f1 and f2 with the repeaters 303 to 308, while the other side passes through the frequencies f3 and f4 with the repeaters 311 to 316. Both base stations use the frequencies f1 to f4 in small areas 302 and 310. While in large areas 317 and 318 crossing each other, one base station can use the frequencies f1 and f2, and the other base station can use the frequencies f3 and f4 without interfering each other. Thus it is possible to improve frequency utilization efficiency.

Furthermore, the present embodiment is not required to use the amplifier with large amplification factor in a base station different from a conventional way, consequently, the size of the base station does not become large. A mobile station such as a portable telephone and so forth can perform communication while utilizing a radio area formed by repeaters with an original configuration, power consumption does not become large different from the conventional way.

Moreover, since it is suitable that many base stations are not placed contrary to the conventional way, therefore, to secure of arranging places for the base station do not required. Since it is suitable that only repeaters are placed, it is possible to suppress equipment cost as the whole systems in comparison with a state where many base stations are placed.

Now, GSM to be European Standard is mentioned as an example, in the GSM, 124 waves of frequencies exist. Since interference occurs when the same frequencies are employed in adjacent cells, thus 31 waves are used in every one cell, and the same frequency is used in every four cells so called as "reuse=4". On the other hand, when the configuration of the above-described embodiment 1 is employed, in the inside of the cell formed by the base station, any base station can use 124 waves, further, 31 waves each become possible to be used according to only the cell formed due to the repeaters. For that reason, frequency utilization efficiency is improved remarkably.

Embodiment 2

Figure 5:
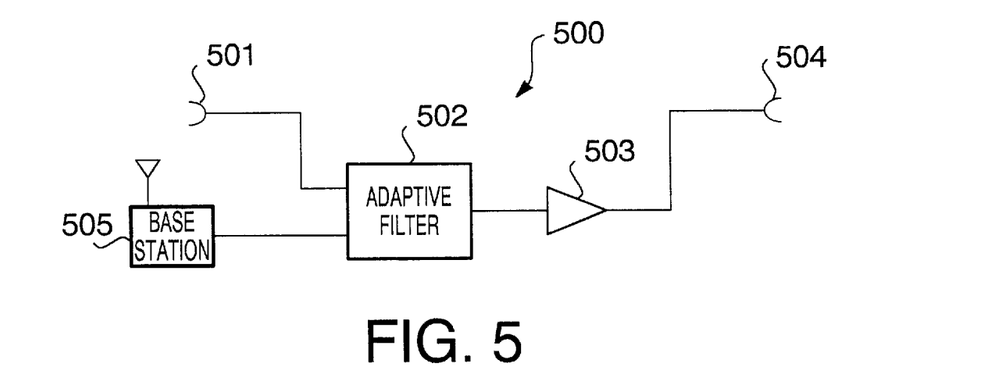
FIG. 5 is a block diagram illustrating a configuration of an adaptive repeater applied to a mobile communication system according to an embodiment 2 of the present invention.

FIG. 5 is a block diagram illustrating a configuration of an adaptive repeater applied to a mobile communication system according to an embodiment 2 of the present invention.

An adaptive repeater 500 illustrated in FIG. 5 is configured to be provided with a directional antenna 501 for receiving a radio wave in a specific direction, an adaptive filter 502 for filtering predetermined signal adaptively among signals received by the directional antenna 501, an amplifier 503 for amplifying signals passed through the adaptive filter 502, and a directional antenna 504 for transmitting signals amplified by the amplifier 503 in a specific direction.

Adaptive control of signal filtering of the adaptive filter 502 is one in which a parameter passing signals is possible to be changed arbitrarily. This control is performed through cable communications or radio communications from a base station 505.

For instance, if the adaptive filter 502 is the FDMA filter, control is performed for changing frequencies to be passed, for instance, for changing the frequency f1 into the frequency f2 in every predetermined time. If the adaptive filter 502 is the CDMA filter, control is performed for changing specified codes to be passed, for instance, for changing the specified code c1 into the specified code c2 in every predetermined time. If the adaptive filter 502 is the TDMA filter, control is performed for changing signal passing time as well as signal passing time period and so forth. According to this adaptive repeater 500, signals to be passed are capable of being changed in accordance with positions of respective mobile stations within a cell.

An example in which this sort of adaptive repeater 500 is used for a cellular system will be described referring to FIG. 6 to FIG. 8. However, the FDMA filter is used as an adaptive filter 502.

Figure 6:
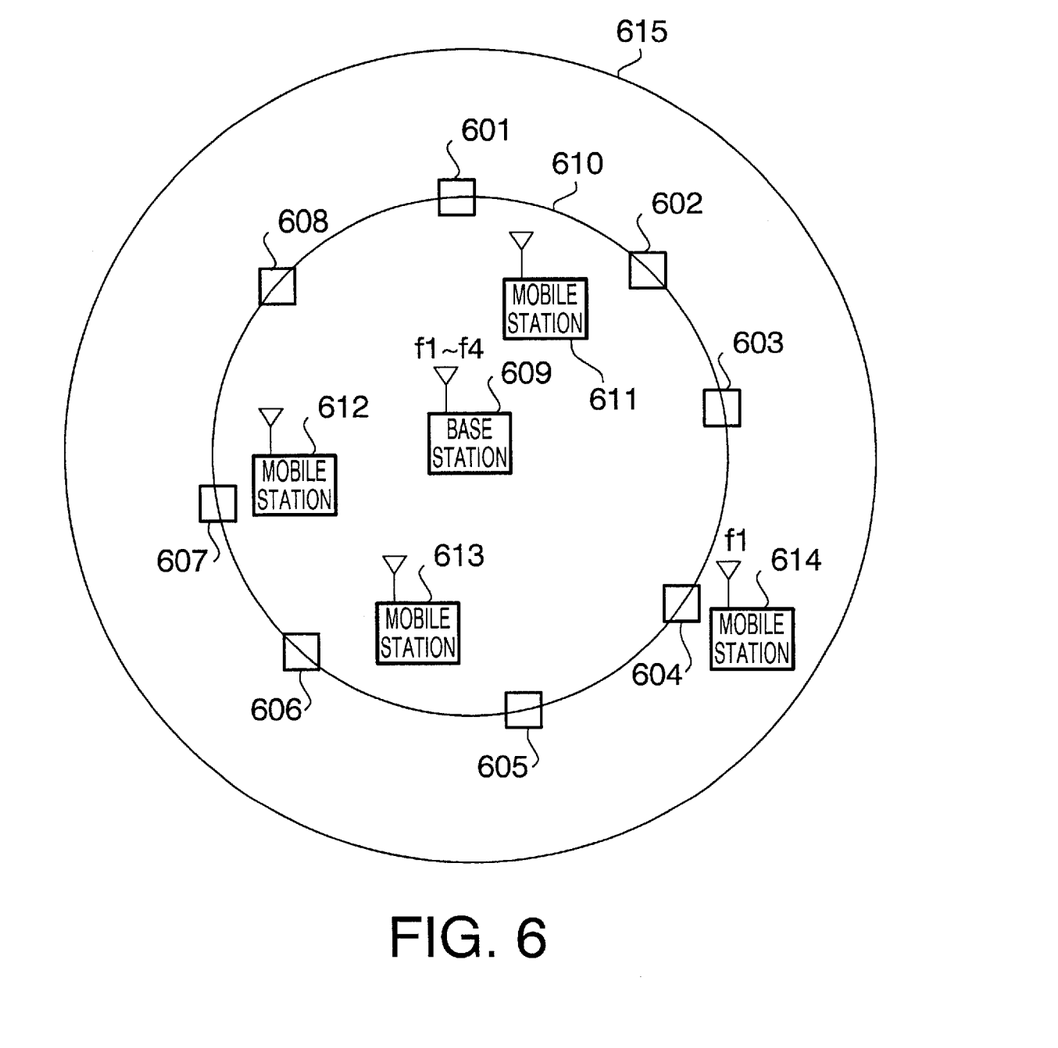
FIG. 6 is a first conception view when a repeater according to the above embodiment 2 is employed in a cellular system.

As illustrated in FIG. 6, adaptive repeaters 601 to 608 are placed along circumference of a cell 610 formed by a radio wave of a base station 609.

Thus, when a plurality of mobile stations 611 to 613 exist on the inside of the cell 610 of the base station 609 and one mobile station 614 exists on the outside of the cell 610 (in the distance), a base station 505 controls adaptive filters of the adaptive repeaters 601 to 608 so as to pass, for instance, only a frequency f1.

According to this processing, a radio wave area 615 in accordance with the frequency f1 is formed on the outside of the cell 610. Then, the mobile station 614 becomes possible to perform communication appropriately while using this frequency f1.

Figure 7:
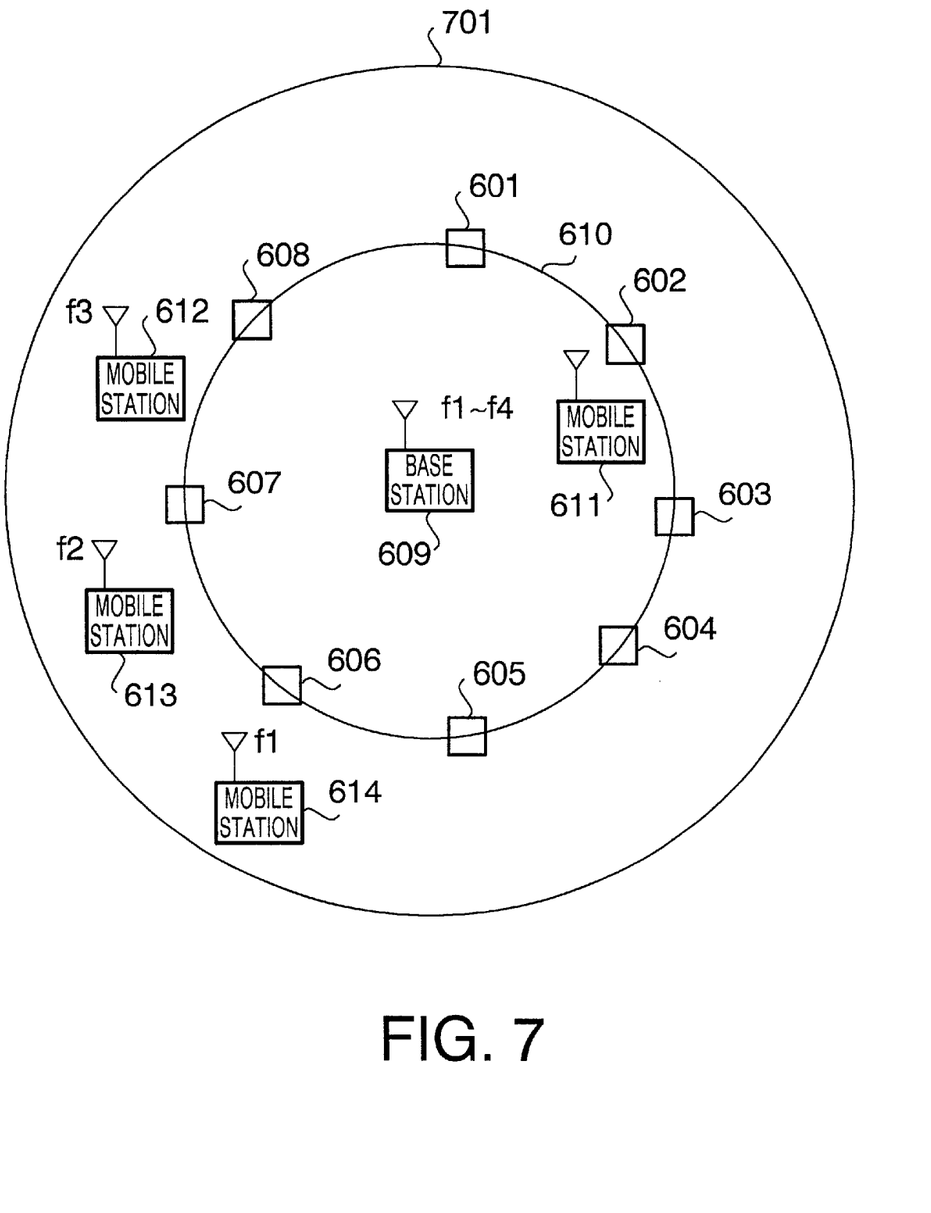
FIG. 7 is a second conception view when a repeater according to the above embodiment 2 is employed in a cellular system.

Subsequently, as illustrated in FIG. 7, on the supposition that the mobile stations 611 to 614 move to be come into the state where one mobile station 611 exists on the inside of the cell 610 of the base station 609 and a plurality of mobile stations 612 to 614 exist on the outside of the cell 610.

In this case, the base station 609 controls the adaptive filters of the adaptive repeaters 601 to 608 so as to pass only the frequencies f1, f2 and f3 which a plurality of the mobile stations 612 to 614 use.

According to this processing, a radio wave area 701 in accordance with the frequencies f1 to f3 is formed on the outside of the cell 610, thus the mobile stations 612 to 614 become possible to perform communication appropriately while employing the frequencies f1 to f3.

However, when a base station detects that a mobile station exists in the distance, since the mobile station transmits signals while synchronizing with a perch channel of the base station, the base station detects distance to the mobile station in such a way that the base station measures time required for back and forth between the mobile station and the perch channel. In another way, the base station detects distance of the mobile station therebetween in such a way that the base station measures reception power in reverse direction from the mobile station to the base station.

Figure 8:
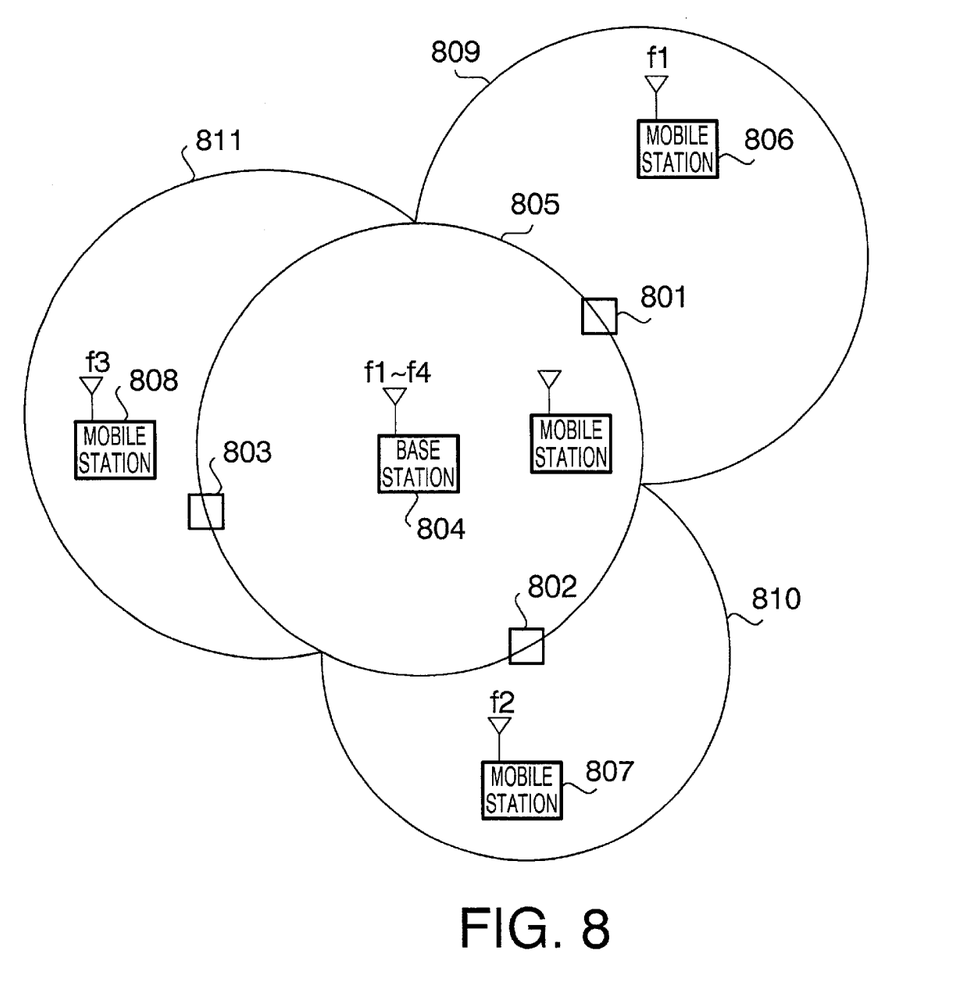
FIG. 8 is a third conception view when a repeater according to the above embodiment 2 is employed in a cellular system.

Further, as illustrated in FIG. 8, adaptive repeaters 801 to 803 are placed with a long distance, for instance, the adaptive repeaters 801 to 803 are placed with interval of 120 degrees along a cell 805 of a base station 804. If the base station 804 controls so as to pass different frequencies f1, f2 or f3 in every each adaptive repeater f1, f2 or f3, it is possible to be performed communication while forming dedicated radio wave areas 809 to 811 on the outside of the cell 805 of the base station 804 for the sake of respective mobile stations 806 to 808 existing separately therefrom mutually.

Thus, according to the present embodiment, since the adaptive filters are used for the adaptive repeaters, when a mobile station exists on the outside of the cell (in the distance) formed in accordance with the base station, the present embodiment is possible to control operation such that only signals of frequency which the mobile station uses are amplified while passing through the adaptive filter of the adaptive repeater.

Furthermore, the present embodiment is not required to use the amplifier with large amplification factor in a base station different from a conventional way, consequently, the size of the base station does not become large. Since a mobile station such as a portable telephone and so forth can perform communication while utilizing a radio area formed in accordance with adaptive repeaters with an original configuration as it is, power consumption does not become large contrary to the conventional way.

Moreover, since it is suitable that many base stations are not placed contrary to the conventional way, thus, to secure arranging places for the base station is not required. Since it is suitable that only adaptive repeaters are placed, it is possible to suppress equipment cost as the whole systems in comparison with a state where many base stations are placed.

Embodiment 3

Figure 9:
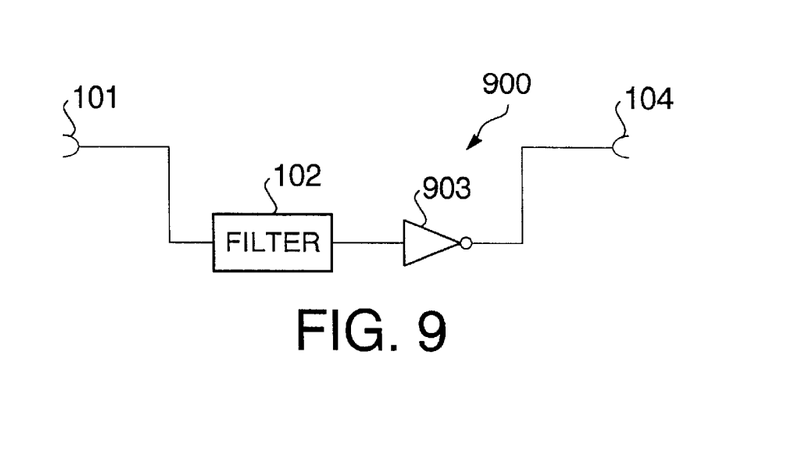
FIG. 9 is a block diagram illustrating a configuration of an inverting repeater applied to a mobile communication system according to an embodiment 3 of the present invention.

FIG. 9 is a block diagram illustrating a configuration of an inverting repeater applied to a mobile communication system according to an embodiment 3 of the present invention.

An inverting repeater 900 illustrated in FIG. 9 is configured to be used an inverting amplifier 903 instead of the amplifier 103 of the repeater 100 illustrated in FIG. 1.

In this inverting repeater 900, a frequency signal passed through a filter 102 is not only amplified by the inverting amplifier 903, but also inverted so as to come to opposite phase. For this reason, an input frequency is eliminated while denying mutually caused by addition of input/output frequency. Namely, signals received by an antenna 101 deny signals transmitted from an antenna 104 mutually. As a result, it is possible not to reach the input frequency beyond the inverting repeater 900.

Figure 10:
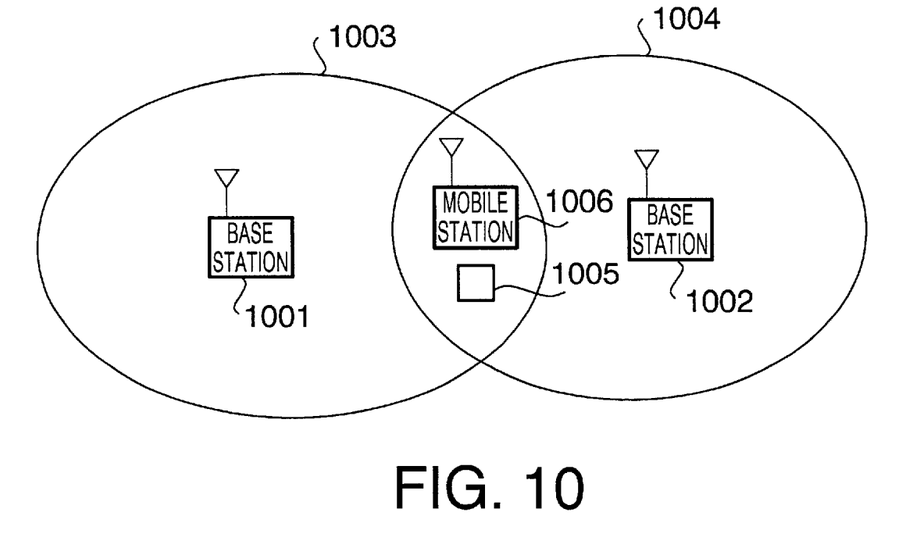
FIG. 10 is a first conception view when the repeater according to the above embodiment 3 is employed in a cellular system.

For instance, as illustrated in FIG. 10, when adjacent cells 1001 and 1002 which cross each other are formed in accordance with adjacent base stations 1001 and 1002, an inverting repeater 1005 is placed in a crossing area of the cells 1003 and 1004.

In such a configuration, when a mobile station 1006 performs a hand-over with movement from one side of the base station 1001 to the other side base station 1002 while existing in this crossing portion, the mobile station 1006 should judge whether which of a reception signal from the base station 1001 in reception at present and a reception signal from the adjacent base station 1002.

In this case, when the inverting repeater 1005 sets to stop a traffic channel from the base station 1002 in order to pass only a perch channel (control channel), the mobile station 1006 is capable of performing above-described judgement from the perch channel. Further, in this case, since a traffic channel whose interference is not desired is stopped by the inverting repeater 1005, the mobile station 1006 is capable of performing the hand-over while performing appropriate talking with only the traffic channel of one frequency used.

Figure 11:
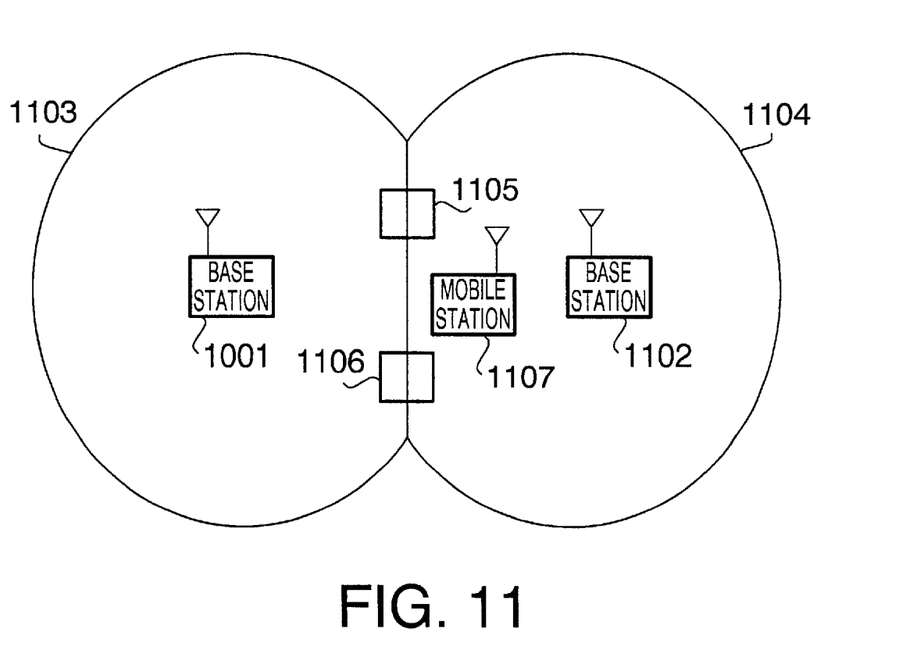
FIG. 11 is a second conception view when the repeater according to the above embodiment 3 is employed in a cellular system.

Further, as illustrated in FIG. 11, in the case where adjacent cells 1103 and 1104 crossing each other are formed by adjacent base stations 1001 and 1102, even though the same frequencies are used in the adjacent cells 1103 and 1104, if inverting repeaters 1105 and 1106 to which mutual frequencies are inputted are placed in the crossing area of the cells 1103 and 1104, there is no interference because respective frequencies are stopped.

Furthermore, it is suitable to configure while employing an inverting amplifier 903 instead of the amplifier 503 of the repeater 500 of the embodiment 2illustrated in FIG. 5.

Figure 12:
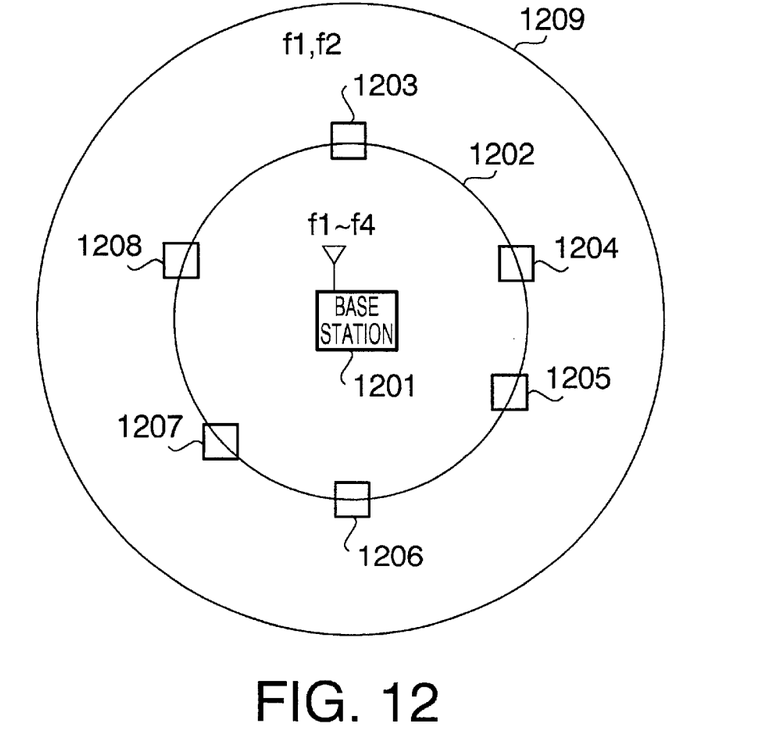
FIG. 12 is a third conception view when the repeater according to the above embodiment 3 is employed in a cellular system.

In this case, the inverting amplifier 903 inverts only signals passed adaptively. According to this processing, it is possible to eliminate the passed frequency of signals. For instance, in FIG. 12, a plurality of inverting repeaters 1203 to 1208 are placed along a cell 1202 formed due to a base station 1201. If frequencies f3 and f4 among frequencies f1 to f4 employed in the base station 1201 are stopped by the inverting repeaters 1203 to 1208, a cell 1209 in accordance with the frequencies f1 and f2 of the signals can be formed on the outside of the cell 1202.

Figure 13:
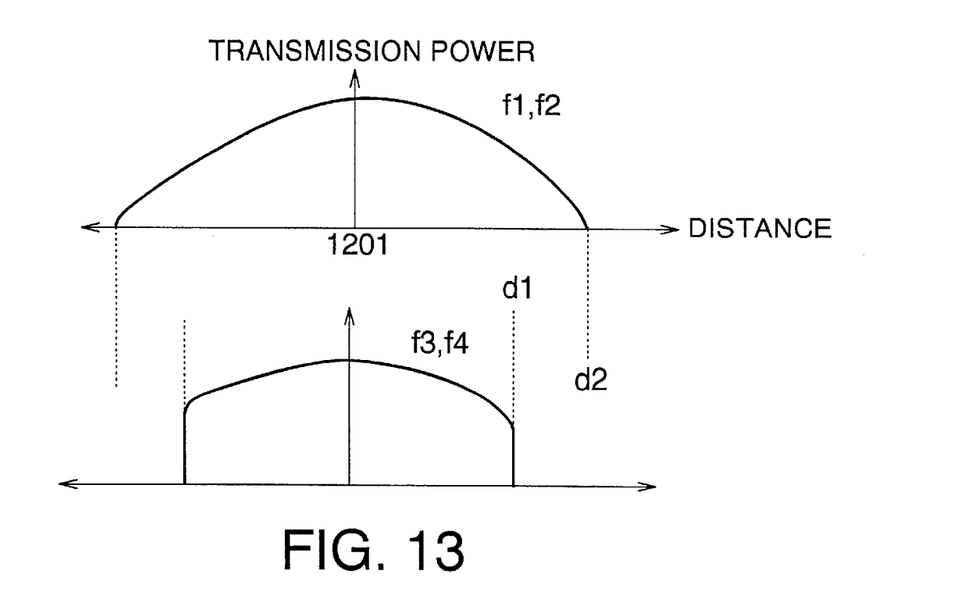
FIG. 13 is a schematic view illustrating the relationship between transmitting power of a base station as well as a repeater illustrated in FIG. 12 and a distance.

Relationship of this case between transmitting power and a distance of the side of the base station 1201 is illustrated in FIG. 13. Transmitting power (transmission signal power) of signals corresponding to frequencies f3 and f4 among signals transmitted by the base station 1201 reaches to a position d1 where the inverting repeaters 1201 to 1208 are placed. However, the transmitting power is attenuated to a value that is one in which a mobile station is impossible to perform communication appropriately. Further, transmitting power of signals corresponding to frequencies f1 and f2 among signals transmitted by the base station 1201 is attenuated to a value that is one in which a mobile station is impossible to perform communication appropriately in an ordinary attenuation position d2.

Namely, it is possible to stop only a specified frequency by the inverting repeaters in accordance with inverse operation described above while referring to FIG. 5 to FIG. 8 in the embodiment 2. Accordingly, it is possible to obtain the same effect as the embodiment 2as things turned out.

Figure 14:
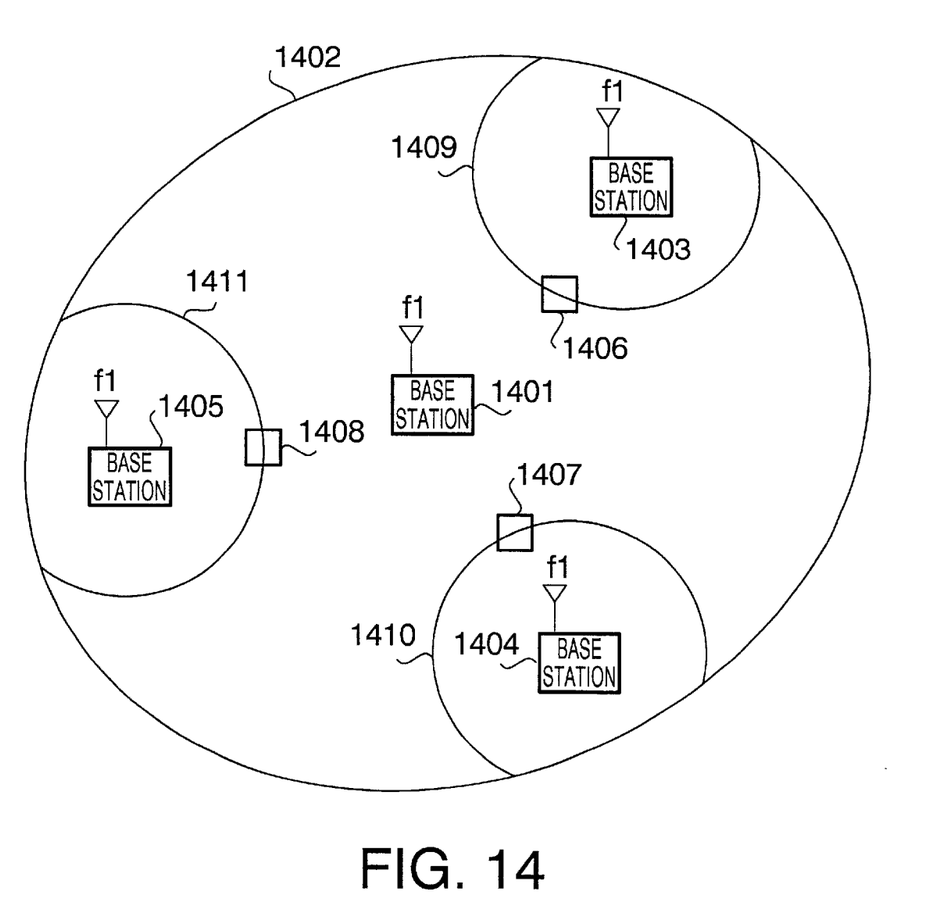
FIG. 14 is a fourth conception view when the repeater according to the above embodiment 3 is employed in a cellular system.

Further, as illustrated in FIG. 14, a plurality of base stations 1403 to 1405 which use the same frequency f1 as a base station 1401 are placed on the inside of a primary cell 1402 formed due to the base station 1401. If inverting repeaters 1406 to 1408 with an inverting amplifier 903 are placed in between the base stations 1403 to 1405 and the base station 1401, the frequency f1 of the primary cell 1402 is stopped at the inverting repeaters 1406 to 1408. A plurality of the base stations 1403 to 1405 capable of forming micro cells 1409 to 1411 with the same frequency f1 respectively on the inside of the primary cell 1402.

According to this processing, a mobile station can perform communication employing different signals with the same frequency f1 because the mobile station capable of performing communication employing the same frequency f1 to different base stations 1401, 1403 to 1405.

Thus, according to the present embodiment, the frequency of the signal passed through the filter of the inverting repeater or the adaptive filter is inverted by the inverting amplifier 903 so that the passed frequency is denied in the output side, therefore, it is possible to eliminate an input frequency of signals passed through a filter. Namely, it is possible not to reach a specific input frequency beyond the inverting repeater.

Further, the present embodiment is not required to employ the amplifier with large amplification factor in a base station different from a conventional way, consequently, the size of the base station does not become large. Since a mobile station such as a portable telephone and so forth can perform communication while utilizing a radio area formed in accordance with inverting repeaters with an original configuration as it is, thus power consumption does not become large contrary to the conventional way.

Moreover, since it is suitable that many base stations are not placed contrary to the conventional way, to secure arranging places for the base station is not required. Since it is suitable that only inverting repeaters are placed, it is possible to suppress equipment cost as the whole systems in comparison with a state where many base stations are placed.

Embodiment 4

Figure 15:
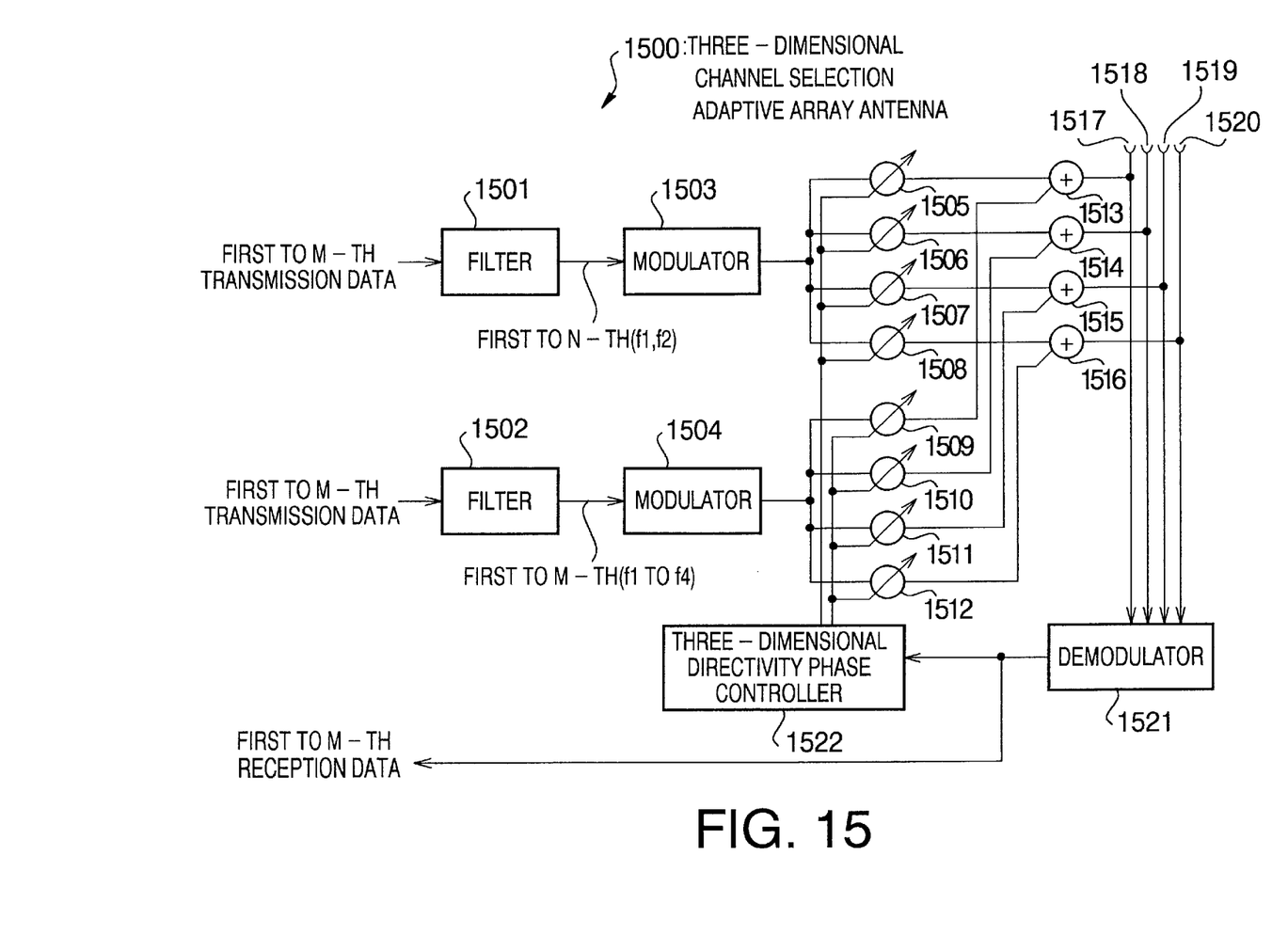
FIG. 15 is a block diagram illustrating a configuration of a three-dimensional channel selection adaptive array antenna applied to a base station of a mobile communication system according to an embodiment 4 of the present invention.

FIG. 15 is a block diagram illustrating a configuration of a three-dimensional channel selection adaptive array antenna applied to a base station of a mobile communication system according to an embodiment 4 of the present invention.

A three-dimensional channel selection adaptive array antenna 1500 (hereinafter referred to as only antenna) illustrated in FIG. 15 is configured to be provided with filters 1501 and 1502, modulators 1503 and 1504, first phase shifters 1505 to 1508, second phase shifters 1509 to 1512, adders 1513 to 1516, antenna elements 1517 to 1520, a demodulator 1521, and a three-dimensional directivity phase controller 1522.

The antenna elements 1517 to 1520 have a three-dimensional antenna structure. Specifically, this antenna element prepares the predetermined numbers of planes with a position relationship of approximately even with the ground. The antenna elements 1517 to 1520 are configured while placing a plurality of antenna arrays on the respective planes. Here, respective planes are located in the direction of approximately vertical with the ground mutually with predetermined interval. Further, there is no limitation of arrangement method of a plurality of antenna arrays on respective planes, however, it is appropriate to place a plurality of antenna arrays regularly in respective antennas in view of easy operation. For instance, in the respective planes, a plurality of antenna arrays are placed in a line with predetermined intervals. While, a plurality of antenna arrays are placed so as to form a cross.

In the filter 1501, the first to the N-th transmission data (f1 and f2) among the first to the M-th transmission data are passed through the filter 1501 to be outputted to the modulator 1503. In the filter 1502, the first to the M-th transmission data (f1, f2, f3 and f4) are passed through the filter 1502 to be outputted to the modulator 1504.

In the modulator 1503, the first to the N-th transmission data (f1 and f2) are modulated depending on a predetermined frequency of carrier (f1 or f2), before being outputted to the first phase shifters 1505 to 1508. In the modulator 1504, the first to the M-th transmission data (f1, f2, f3 and f4) are modulated depending on a predetermined frequency of carrier (any of f1 to f4), before being outputted to the second phase shifters 1509 to 1512.

The signals passed through the first phase shifters 1505 to 1508 as well as passed through the second phase shifters 1509 to 1512 are added in the adders 1513 to 1516 to be transmitted through the antenna elements 1517 to 1521.

Further, signals received by the antenna elements 1517 to 1520 are demodulated by the demodulator 1521. The demodulated first to M-th reception data (f1, f2, f3 and f4) are outputted to the three dimensional directivity phase controller 1522.

The three-dimensional directivity phase controller 1522 performs control for adding predetermined directivity to signals from the modulators 1503 and 1504 in the first phase shifters 1505 to 1508 as well as the second phase shifters 1509 and 1512 in accordance with the first to the M-th reception data (f1, f2, f3 and f4).

Figure 16:
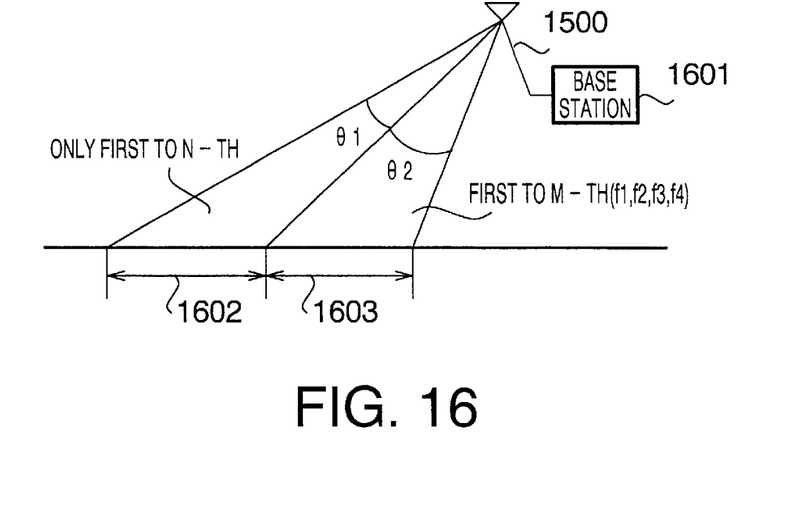
FIG. 16 is an explanation view of three-dimensional directivity phase control operation for adding directivity to the three-dimensional channel selection adaptive array antenna in a vertical direction according to the above embodiment 4.
Figure 17:
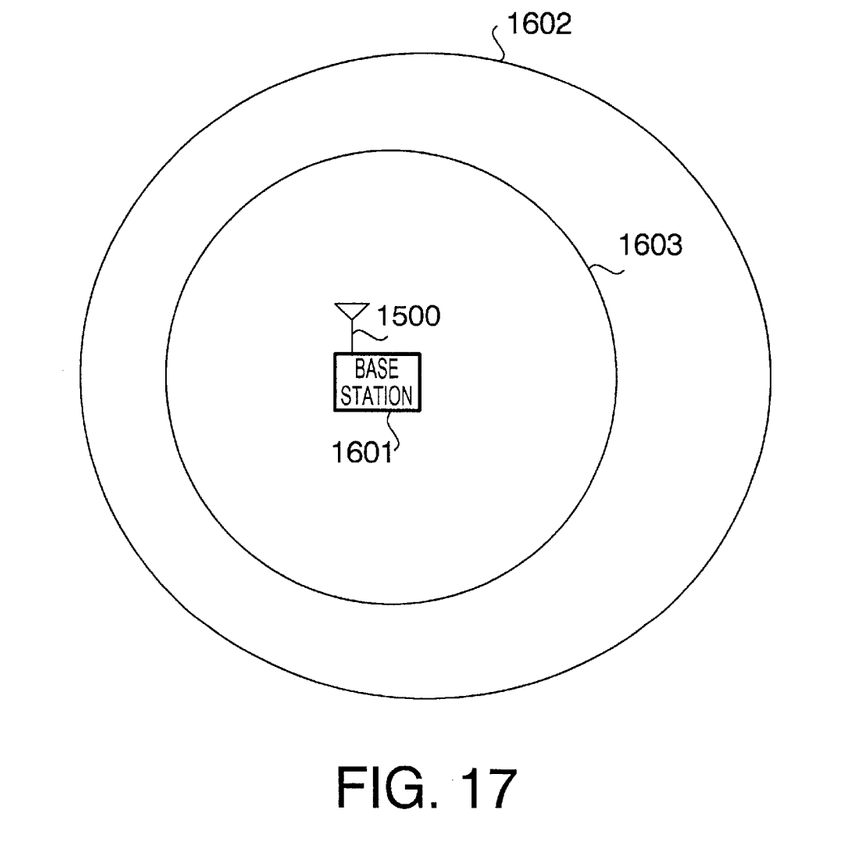
FIG. 17 is a first conception view of a cell formed due to three-dimensional directivity phase control for adding directivity to the three-dimensional channel selection adaptive array antenna in a vertical direction according to the above-described embodiment 4.

As illustrated in FIG. 16, this control is to possess directivity with arbitrary angles θ1 and θ2 in vertical direction from an antenna 1500 in high position, which the antenna 1500 is mounted on a base station 1601. According to this configuration, as illustrated in FIG. 17, it is possible to form inherent doughnut-shaped radio wave areas (cells) 1602 and 1603 in places respective near and far.

In this example, a signal area of frequencies f1 and f2 modulated depending on the first to the N-th transmission data is formed in an outer side cell 1602. While a signal area of frequencies f1, f2, f3 and f4 modulated depending on the first to the M-th transmission data is formed in an inner side cell 1603. According to this processing, four frequencies can be used in the cell 1603, further different users are capable of re-using two frequencies f1 and f2 in the cell 1602.

Figure 18:
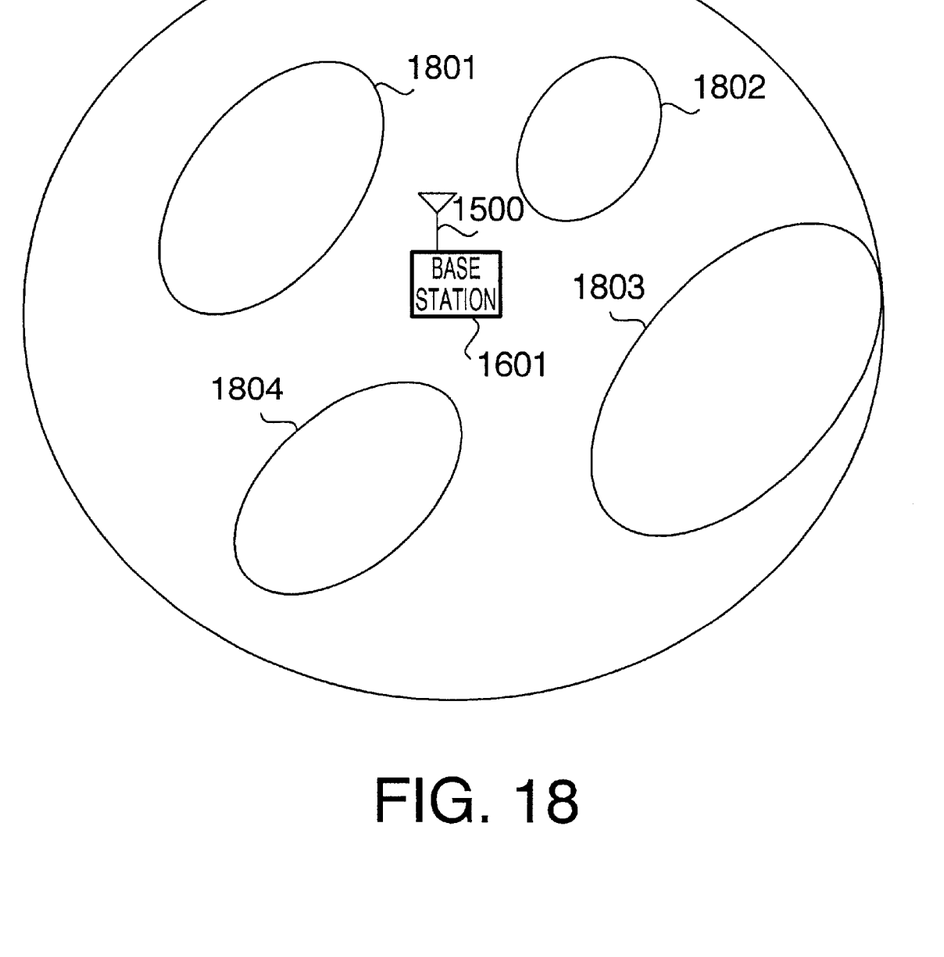
FIG. 18 is a conception view of a cell formed due to three-dimensional directivity phase control for adding directivity to the three-dimensional channel selection adaptive array antenna in horizontal/vertical direction according to the above-described embodiment 4.

Further, if control is performed such that directivity in horizontal/vertical direction is set, as illustrated in FIG. 18, a plurality of spot-shaped areas (cells) 1801 to 1804 are capable of being formed.

Figure 19:
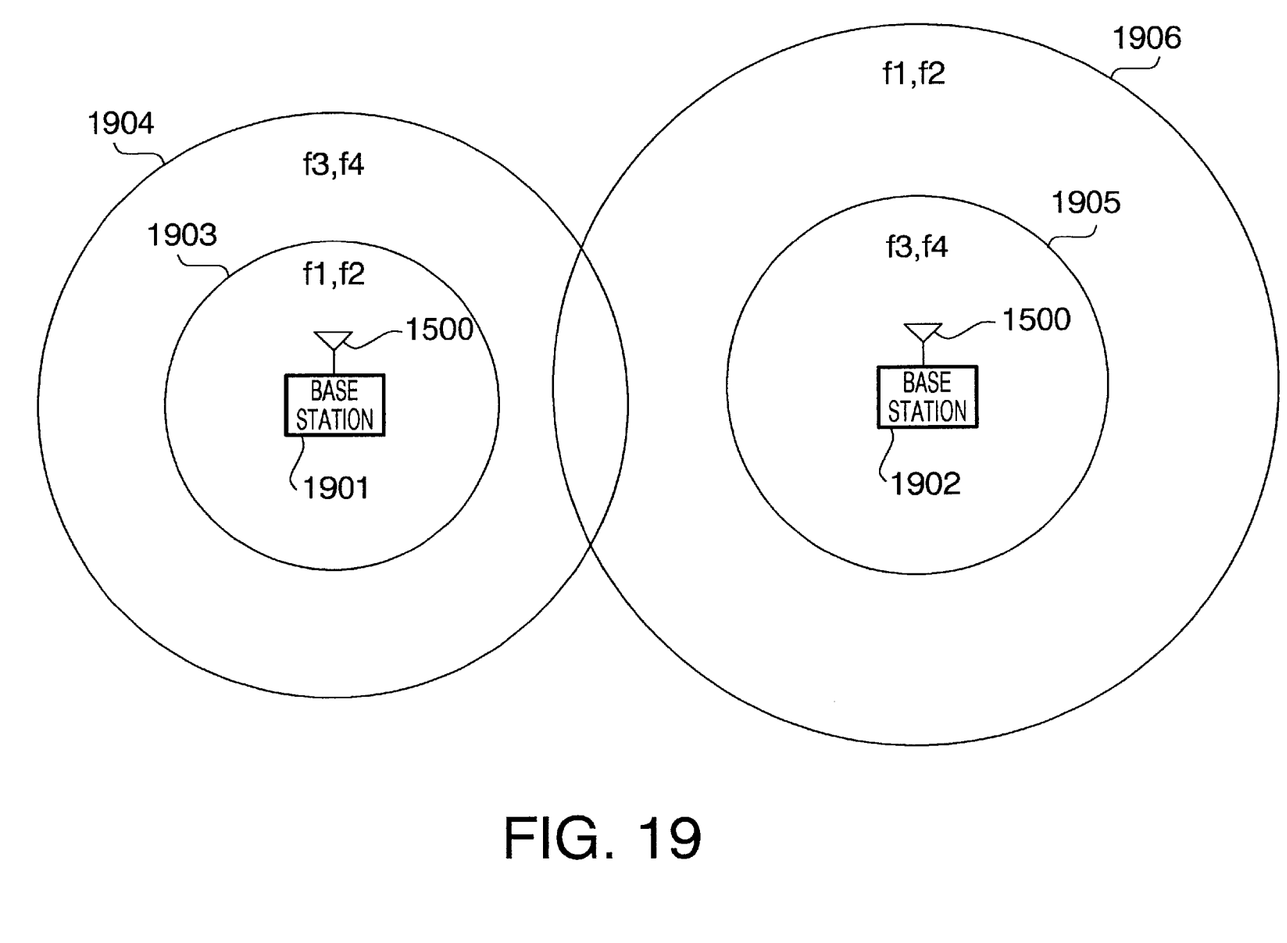
FIG. 19 is a second conception view of a cell formed due to three-dimensional directivity phase control for adding directivity to the three-dimensional channel selection adaptive array antenna in a vertical direction according to the above-described embodiment 4.

Furthermore, as illustrated in FIG. 19, in two base stations 1901 and 1902 mounted with an antenna 1500, it is also suitable that sells 1903 and 1904, and cells 1905 and 1906 are formed such that mutual inner sides and outer sides are different.

Namely, in the base station 1901, an inner side cell 1903 is formed by frequencies f1, f2, f3 and f4 of signals, while an outer side cell 1904 is formed by frequencies f3 and f4 of signals. Further, in the base station 1902, an inner side cell 1905 is formed by the frequencies f1, f2, f3 and f4 of the signals so as not to cross to the cell 1903, while forming an outer side cell 1906 by the frequencies f1 and f2. According to this processing, in the inner side cell 1903 as well as in the inner side cell 1905, different users can use the frequencies f1, f2, f3 and f4. Further also in the outer side cell 1904, different users can use the frequencies f3 and f4, and also in the outer side cell 1906, different users can use the frequencies f1 and f2. For this reason, it is possible to improve frequency utilization efficiency.

Furthermore, it is also suitable that the first phase shifters 1505 to 1508 as well as the second phase shifters 1509 to 1512 adds fixedly predetermined directivity to signals from the modulators 1503 and 1504.

Thus, according to the present embodiment, directivity with arbitrary angles θ1 and θ2 in vertical direction from an antenna is set so that it is possible to form doughnut-shaped inherent radio wave areas (cells) in places respective near and far with the same frequency. Further, directivity is set in horizontal/vertical direction so that it is possible to form a plurality of spot-shaped areas (cells) using the same frequency. Consequently, it is possible to improve frequency utilization efficiency.

As described-above, according to the present invention, it is possible to enlarge a radio wave area of a base station while suppressing the size increase of a base station, power consumption of a mobile station, the cost for the whole systems, and interference in adjacent cells.

This application is based on the Japanese Patent Application No. HEI 11-094288 filed on Mar. 31, 1999, entire content of which is expressly incorporated by reference herein.

INDUSTRIAL APPLICABILITY

The present invention is utilized appropriately in a field of a digital mobile communication system.

What is claimed is:

1. A mobile communication system comprising:

a first base station that uses a plurality of channels;

a second base station that uses the same plurality of channels used by the first base station;

a first repeater, located on an edge of a first cell formed by the first base station and communicating with said first base station, that lets pass and amplifies a first specific channel of the plurality of channels used by said first base station, so as to further form a first radio wave area, outside said first cell, to which the first repeater communicates using the first specific channel; and a second repeater, located on an edge of a second cell formed by the second base station and communicating with said second base station, that lets pass and amplifies a second specific channel of the plurality of channels used by said second base station, so as to further form a second radio wave area, outside said second cell, to which the second repeater communicates using the second specific channel, wherein the first and second specific channels differ from each other.

2. The mobile communication system according to claim 1, wherein the first cell and the second cell do not cross over each other.

3. The mobile communication system according to claim 1, wherein the first radio wave area and the second radio wave area partially cross over each other.

4. The mobile communication system according to claim 1, wherein the first repeater and the second repeater each change the respective first and second specific channels to pass and amplify in every predetermined time.

5. A repeater used in the mobile communication system of claim 1, comprising:

a receiving antenna having a directivity set in a direction of a base station;

a filter that lets pass a specific channel of a plurality of channels received by the receiving antenna;

an amplifier that amplifies the specific channel that passes through the filter; and a transmitting antenna that transmits the specific channel amplified through the amplifier to outside a cell formed by the base station, wherein the specific channel that the filter lets pass differs from a channel that a filter of another repeater located on an edge of a cell that adjoins the cell formed by the base station lets pass.

* * * * *